(12) United States Patent
Khawand et al.

(10) Patent No.: US 7,398,528 B2
(45) Date of Patent: Jul. 8, 2008

(54) METHOD AND SYSTEM FOR EFFICIENT MULTIPROCESSOR PROCESSING IN A MOBILE WIRELESS COMMUNICATION DEVICE

(75) Inventors: Charbel Khawand, Miami, FL (US); Raziuddin Ali, Weston, FL (US); Mayra Zayas, Pembroke Pines, FL (US)

(73) Assignee: Motorola, Inc., Schaumburg, IL (US)

( * ) Notice: Subject to any disclaimer, the term of this patent is extended or adjusted under 35 U.S.C. 154(b) by 277 days.

(21) Appl. No.: 10/988,062

(22) Filed: Nov. 13, 2004

(65) Prior Publication Data

US 2006/0106958 A1    May 18, 2006

(51) Int. Cl.
*G06F 9/44* (2006.01)
(52) U.S. Cl. .................... 719/314; 718/100
(58) Field of Classification Search ......... 719/310–314; 718/100–105; 710/19, 14; 714/12; 370/315; 455/418, 419; 709/219
See application file for complete search history.

(56) References Cited

U.S. PATENT DOCUMENTS

| | | | | |
|---|---|---|---|---|
| 5,440,741 | A * | 8/1995 | Morales et al. | 718/103 |
| 5,574,849 | A * | 11/1996 | Sonnier et al. | 714/12 |
| 5,675,807 | A * | 10/1997 | Iswandhi et al. | 710/260 |
| 5,751,932 | A * | 5/1998 | Horst et al. | 714/12 |
| 6,157,967 | A * | 12/2000 | Horst et al. | 710/19 |
| 6,229,813 | B1 * | 5/2001 | Buchko et al. | 370/412 |
| 6,442,565 | B1 * | 8/2002 | Tyra et al. | 707/102 |
| 6,651,111 | B2 * | 11/2003 | Sherman et al. | 710/14 |
| 6,754,321 | B1 * | 6/2004 | Innes et al. | 379/201.03 |
| 7,032,003 | B1 * | 4/2006 | Shi et al. | 709/203 |
| 7,072,354 | B1 * | 7/2006 | Beathard | 370/447 |
| 7,209,916 | B1 * | 4/2007 | Seshadri et al. | 707/3 |
| 2002/0194287 | A1 * | 12/2002 | Tyra et al. | 709/206 |
| 2004/0117459 | A1 * | 6/2004 | Fry | 709/219 |
| 2004/0125815 | A1 | 7/2004 | Shimazu et al. | |
| 2004/0192282 | A1 * | 9/2004 | Vasudevan | 455/419 |
| 2005/0102529 | A1 * | 5/2005 | Buddhikot et al. | 713/200 |
| 2005/0286457 | A1 * | 12/2005 | Foster et al. | 370/315 |
| 2005/0288001 | A1 * | 12/2005 | Foster et al. | 455/418 |

OTHER PUBLICATIONS

Tsuei et al. "Queuing Simulation Model for Multiprocessor Systems" 2003 IEEE, pp. 58-64.*
Ayachi et al. "A Hierarchical Processor Scheduling Policy For Multiprocessor Systems" 1996 IEEE. pp. 100-109.*
Allot Communications, "Multi-Level Traffic Management—White Paper", P/N D004001 REV 1 A May 2000.

* cited by examiner

*Primary Examiner*—Van H Nguyen
(74) *Attorney, Agent, or Firm*—Pablo Meles

(57) ABSTRACT

A multiprocessor system (206) having a plurality of processors (304-306), each processor capable of processing at least one queue (404A-404N) of at least one service application, and at least one task (402A-402N) comprising at least one of the at least one queue; and wherein a first processor and a second processor of the plurality of processors is each programmed to delegate (602) a service application from the first processor to a queue of the at least one queue of the second processor, evaluate (604-606) the queue at the second processor according to flow control criteria, process (608) the service application at the second processor upon satisfying the flow control criteria, and reject (610) the service application at the second processor upon failing to satisfy the flow control criteria.

19 Claims, 4 Drawing Sheets

METHOD AND SYSTEM FOR EFFICIENT MULTIPROCESSOR PROCESSING IN A MOBILE WIRELESS COMMUNICATION DEVICE

FIELD OF THE INVENTION

This invention relates generally to mobile devices, and more particularly to mobile devices including an efficient multiprocessor system and methods thereof.

BACKGROUND OF THE INVENTION

Emerging mobile communications are increasingly multimedia rich and often involve concurrent processing and memory intensive operations like location-based services, navigation services, video (recording, playback, streaming), text-to-speech synthesizers, and speech recognition, just to name a few.

To address these applications, designers of mobile devices are employing multi-processor architectures such as, for example, an ARM (Advanced Risk Machines) combined, or integrated, with a similar processor intercommunicating with conventional inter-processor protocols.

The foregoing architecture suffers from poor processing efficiency when sharing software service applications in a multiprocessor system. Embodiments in accordance with the invention presented below overcomes this deficiency.

SUMMARY OF THE INVENTION

Embodiments in accordance with the invention provide an apparatus and method for substantially improving the efficiency of a multiprocessor system.

In a first embodiment of the present invention, a multiprocessor system has a plurality of processors, each processor capable of processing at least one queue of at least one service application, and at least one task comprising at least one of the at least one queue. The multiprocessor system includes a method comprising the steps of delegating a service application from a first processor of the plurality of processors to a queue of the at least one queue of a second processor of the plurality of processors, evaluating the queue of the second processor according to flow control criteria, processing the service application at the second processor upon satisfying the flow control criteria, and rejecting the service application at the second processor upon failing to satisfy the flow control criteria.

In a second embodiment of the present invention, a multiprocessor system has a plurality of processors, each processor capable of processing at least one queue of at least one service application, and at least one task comprising at least one of the at least one queue. A first processor and a second processor of the plurality of processors is programmed to delegate a service application from the first processor to a queue of the at least one queue of the second processor, evaluate the queue at the second processor according to flow control criteria, process the service application at the second processor upon satisfying the flow control criteria, and reject the service application at the second processor upon failing to satisfy the flow control criteria.

In a third embodiment of the present invention, a mobile device has a multiprocessor system including a plurality of processors, each processor capable of processing at least one queue of at least one service application, and at least one task comprising at least one of the at least one queue. A first processor and a second processor of the plurality of processors are programmed to receive and transmit messages by way of the transceiver to a communication system, delegate a service application from the first processor to a queue of the at least one queue of the second processor, evaluate the queue at the second processor according to flow control criteria, process the service application at the second processor upon satisfying the flow control criteria, and reject the service application at the second processor upon failing to satisfy the flow control criteria.

DETAILED DESCRIPTION OF THE DRAWINGS

Figure 1:
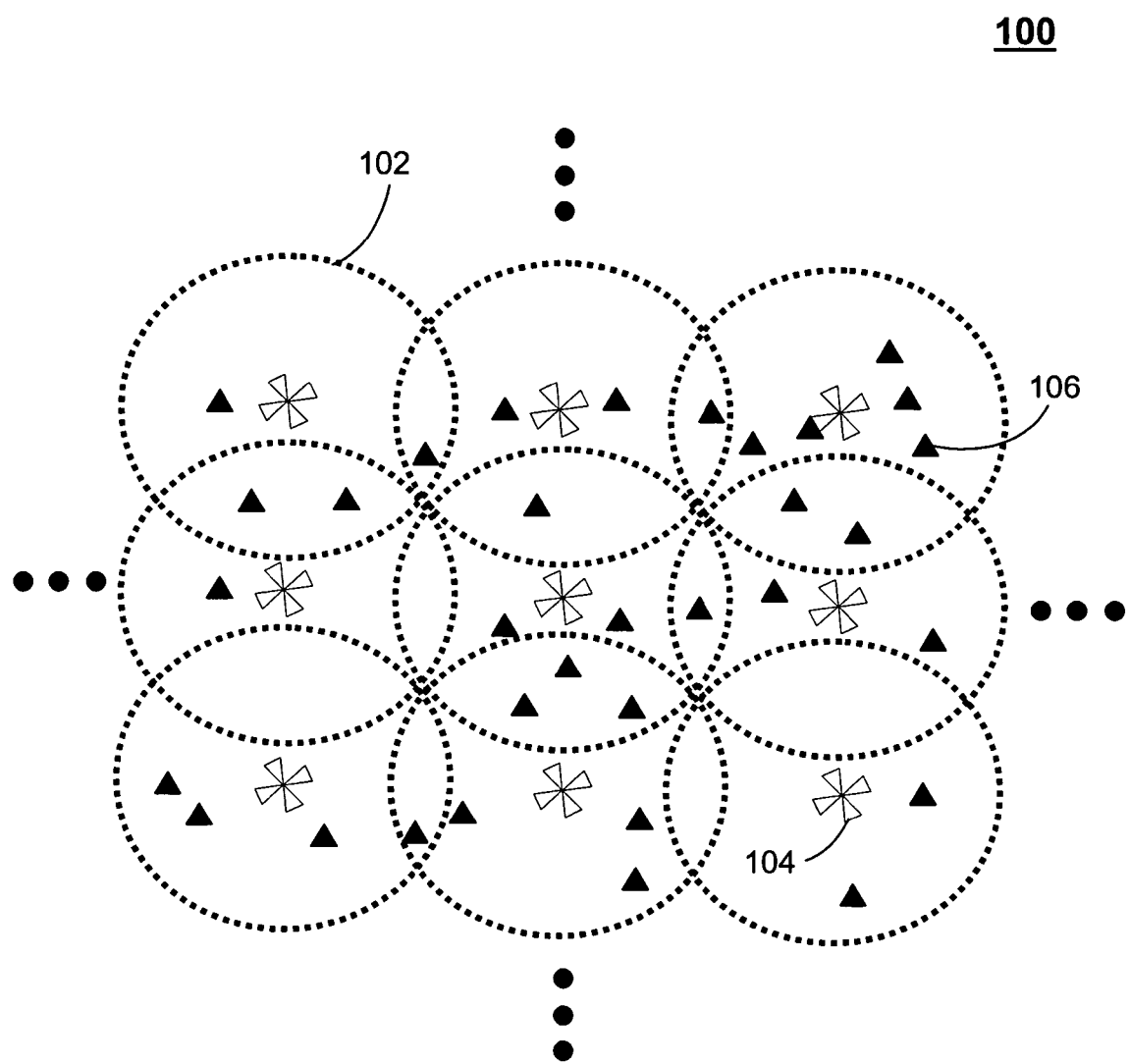
FIG. 1 is an illustration of a communication system communicating with a number of mobile devices according to an embodiment of the present invention.

While the specification concludes with claims defining the features of embodiments of the invention that are regarded as novel, it is believed that the embodiments of the invention will be better understood from a consideration of the following description in conjunction with the figures, in which like reference numerals are carried forward.

FIG. 1 is an illustration of a communication system 100 communicating with a number of mobile devices 106 according to an embodiment of the present invention. The communication system 100 is a conventional wireless network comprising a plurality of radio base stations 104, each covering a geographic cell site 102, which in the aggregate cover, for example, a metropolitan area.

In this system 100, the mobile device 106 can take the form of a conventional cellular phone, or other radio communications device (e.g., a wireless PDA coupled to a wireless local area network). It would obvious to one of ordinary skill in the art, however, that the invention is applicable to a non-wireless mobile device 106 such as, for example, portable gaming device (e.g., GameBoy™), DVD video players, and so on. More broadly speaking, the invention discussed below is applicable to any mobile device 106 having an efficient multiprocessor system as depicted by a method 600 illustrated in FIG. 6 to be described shortly.

For illustration purposes only, the discussion below will focus on a mobile device 106 with wireless capability. All alterations and additions to the proceeding description of the invention leading to an equivalent structure, that is, a structure that presents the same function, way and result as the embodiments described herein is intended to be within the scope and spirit of the claims below.

Figure 2:
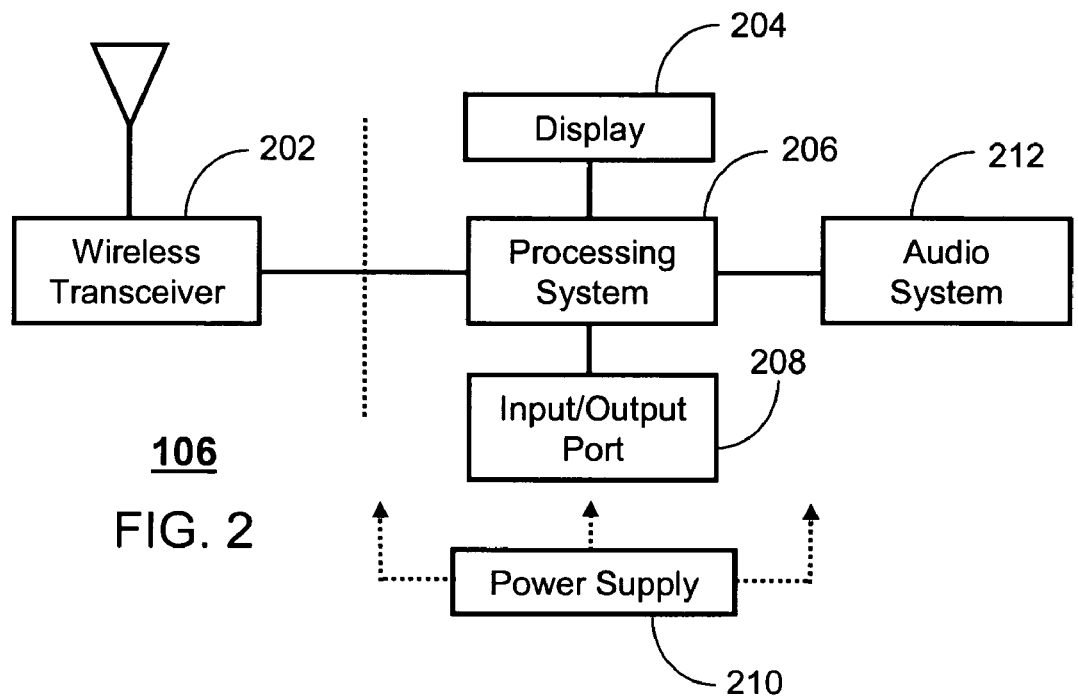
FIG. 2 is a detailed view of a mobile device according to an embodiment of the present invention.

FIG. 2 shows a detailed view of the mobile device 106 according to an embodiment of the present invention. The mobile device 106 comprises conventional components such as a wireless transceiver 202, a display 204, an input/output port 208, a battery supply 210, and an audio system 212. The hashed line next to the wireless transceiver 202 represents an alternative embodiment characterized by a non-wireless mobile device 106 such as described above.

The processing system 206 is the processing center for the mobile device 106, which controls operations of the foregoing components 202-212. The processing system 206 controls singly or concurrently voice processing (e.g., voice calls), multi-media processing (video MPEG 4 player), data message processing (e.g., application downloads, short message system exchanges, etc.), and other house-keeping functions of the mobile device 106. The processing system 206 uses an operating system for distributing service applications in a manner consistent with method 600 of FIG. 6. Service applications can represent all inclusive software algorithms (e.g., an MPEG 4 video decoder), or portions thereof subdivided into tasks (e.g., input/output drivers, display drivers, etc.) and/or primitive instructions such as microcode.

Figure 3:
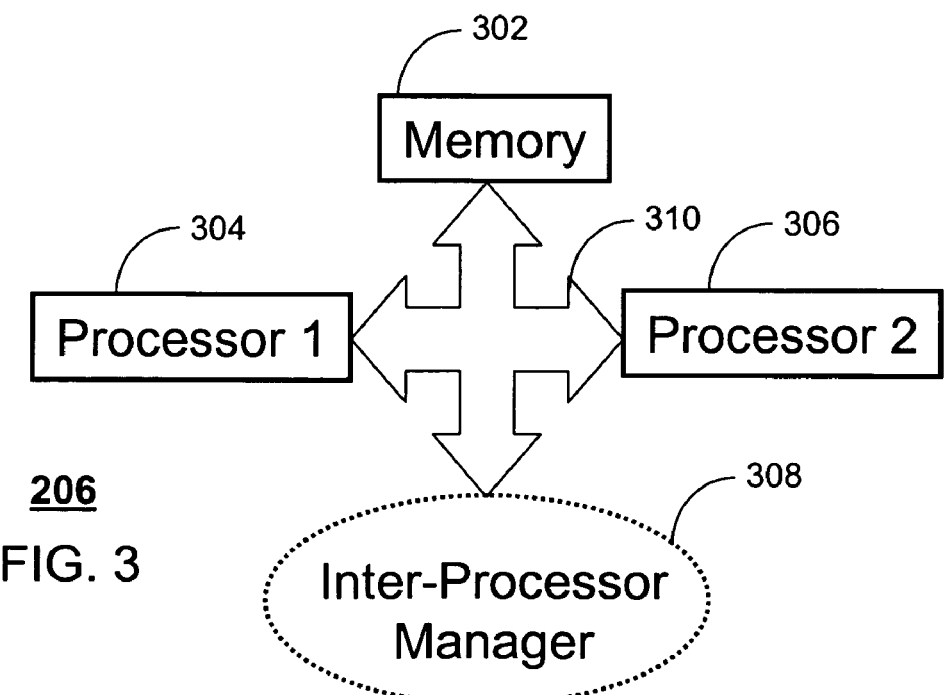
FIG. 3 is detailed view of the processing system according to an embodiment of the present invention.

FIG. 3 shows a detailed view of the processing system 206, comprising a conventional memory 302, a plurality of processors 304-306 (shown by way of example as first and second processors) and an inter-processor manager 308 according to an embodiment of the present invention. The memory 302 can be a single or a combination of conventional memory devices (e.g., dynamic random access memory, flash memory, etc.) operated on individually or jointly by the elements 304-308 of the processing system 206.

The plurality of processors 304-306 employ conventional processing elements such as, for example, an ARM processor. The inter-processor manager 308 can comprise a conventional application specific integrated circuit (ASIC), a microprocessor, a state machine, or other processing means that is capable of operating according to the method 600 of FIG. 6. Alternatively, the processing function of the inter-processor manager 308 can take the form of hardware, software or combinations thereof operating in whole or in part from the first or second processors 304, or independent hardware.

The processing elements 302-308 of the processing system 206 are interconnected by a conventional communication bus 310. The construction of the bus 310 can be physical or logical. In the former, the physical connection can be a conventional serial or parallel bus for transmitting signals between devices sourced by a conventional transceiver (e.g., universal asynchronous receiver transmitter—UART, or universal serial bus—USB driver). Alternatively, a portion or whole of the communication bus 310 can represent a logical connection such as software components sharing data structures. The processing elements 302-308 coupled to the communication bus 310 can be represented in a single integrated circuit (IC) device with sub-elements operating therein, or a combination of ICs, each operating as a corresponding one of the elements 302-308 of the processing system 206.

Figure 4:
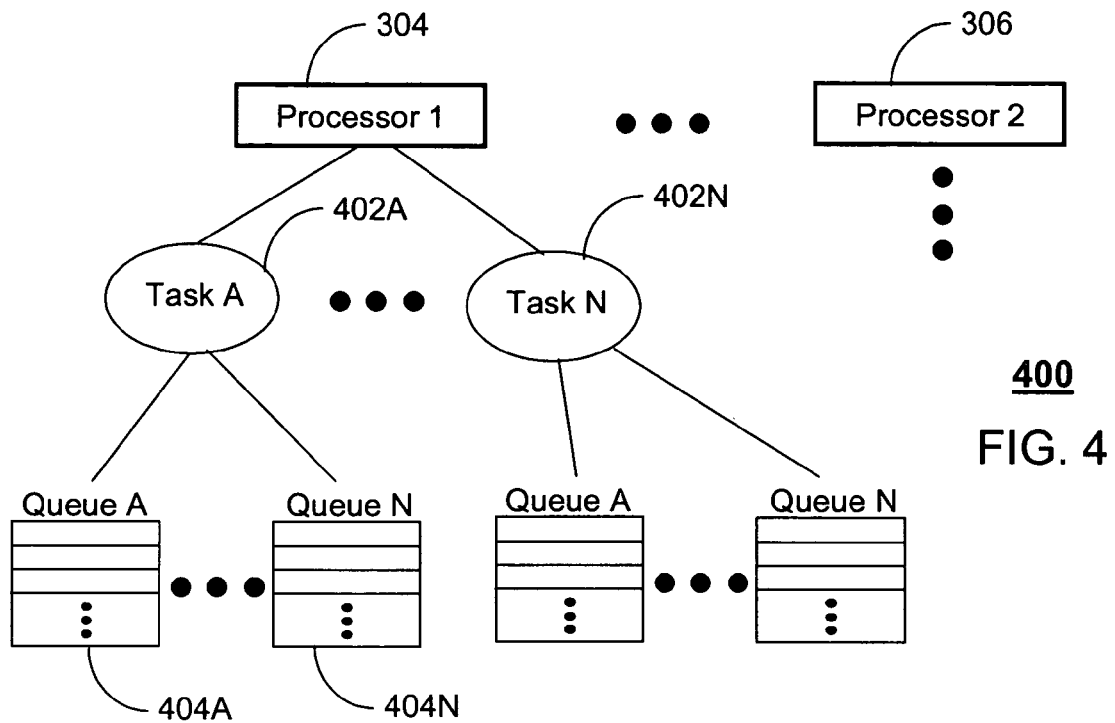
FIG. 4 is a block diagram of a software architecture applied to each processor according to an embodiment of the present invention.

FIG. 4 is a block diagram of a software architecture 400 applied to each processor 304-306 according to an embodiment of the present invention. The software architecture 400 comprises at least one task. In the present example, however, a number of tasks 402A-402N are shown in FIG. 4. Each task 402 comprises at least one queue 404 for processing at least one service application. In the present example, a number of queues 404A-404N are shown. The second processor 306 can have any number and combination of tasks 402 and corresponding service queues 404.

Figure 6:
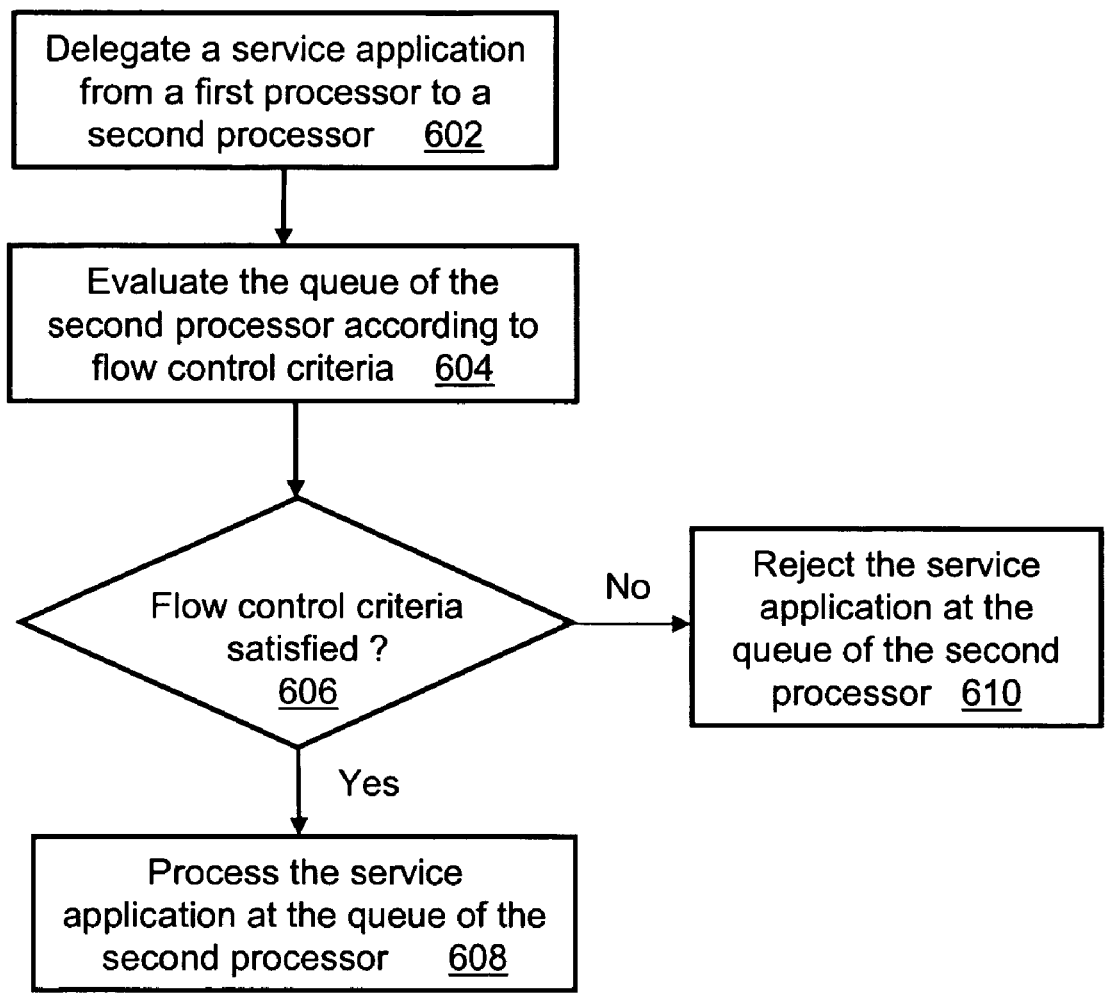
FIG. 6 is a flow chart depicting a method for improving the processing efficiency of service applications operating in the mobile device according to an embodiment of the present invention.

FIG. 6 is a flow chart depicting a method 600 for substantially improving the processing efficiency of service applications operating in the mobile device 106 according to an embodiment of the present invention. We begin with step 602, where the first and second processors 304-306 of the mobile device 106 are programmed to delegate a service application from the first processor 304 to a queue 404 of the second processor 306. The rationale for this delegation can be, for instance, the first processor 304 running out of processing capacity for a particular task 402 or sub-task (represented by a particular queue 404).

In step 604, the queue 404 of the second processor 306 is evaluated according to flow control criteria. In a first embodiment, the evaluation step can take place at the inter-processor manager 308. Alternatively, the evaluation step can take place at the second processor 306. It will be appreciated by one of ordinary skill in the art that the method 600 described herein can be distributed to the processors 304-306, centralized in the inter-processor manager 308, or any combinations thereof.

Returning to step 604, the flow control criteria can include a capacity threshold for each queue 404. The capacity threshold indicates the capacity of the queue 404 for processing service applications. In one embodiment, the service application is processed in step 608 by the second processor 306 if at decision block 606 it is determined that the capacity threshold of the queue 404 is not exceeded (i.e., the flow control criteria has been satisfied). On the other hand, the service application is rejected by the second processor 306 in step 610 upon determining at decision block 606 that the capacity threshold of the queue 404 has been exceeded. This embodiment reflects a fixed capacity threshold for managing the capacity of the queues 404.

Figure 5:
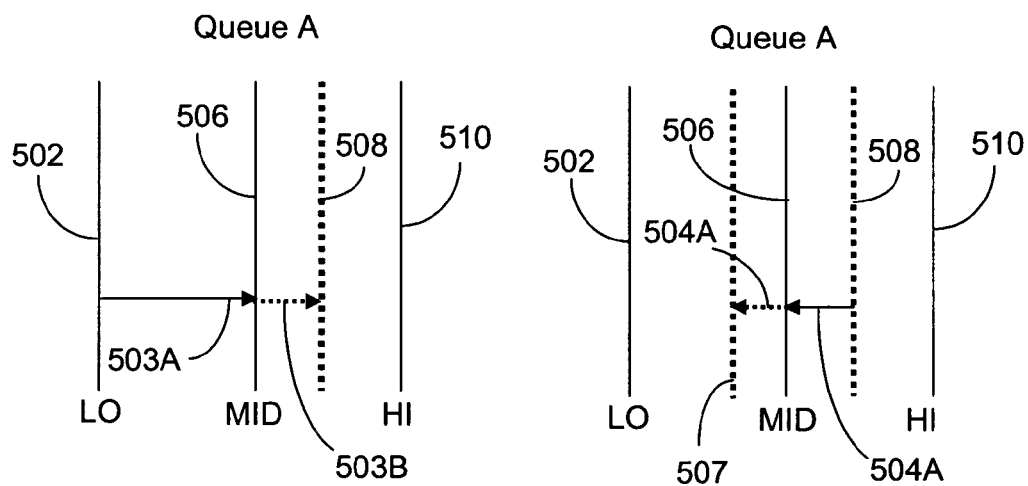
FIG. 5 is a diagram illustrating a variable capacity threshold according to an embodiment of the present invention.

Alternatively, the capacity threshold can be variable. In such an embodiment, the capacity threshold can follow a hysteresis effect as demonstrated by the graph 500 of FIG. 5. In FIG. 5, the queue 404A (of FIG. 4) has three thresholds LO 502, MID 506 and HI 508. The LO 502 threshold represents an empty or nearly empty queue 502. The MID 506 threshold represents a half-full or nearly half-full queue 402A. And the HI 508 threshold represents a full or nearly full queue 404A.

During operation, the queue 404A begins to fill with service applications received by the second processor 306. This process is represented as a capacity level 503A. As the capacity level 503A traversing the MID 506 threshold, a new capacity level 503B is created. The new capacity level 503B is artificially created so that in the process of reducing the capacity level represented by 504A (i.e., capacity level 503B in the reverse direction) more than one service application must be processed by the second processor 306 before reaching the MID 506 threshold. When reduction in the queue 404A reaches the MID 506 threshold, the capacity level 504A jumps to the capacity level 504B. From this point, increases in the size of the queue 404A again requires receiving more than one service application to reach the MID 506 threshold, thereby restarting the cycle described above.

The hysteresis effect demonstrated in FIG. 5 has the benefit of eliminating oscillations that can occur when increasing and decreasing the queue 404A around the MID 506 threshold. Using the MID 506 threshold as flow control criteria for managing the queues 404 of tasks 402 has the added benefit of a more stable environment for managing the queues 404 of each of the processors 304-306 by way of suspend and resume commands submitted in step 610.

In step 610, the second processor 306 submits a suspend command to the inter-processor manager 308, which in turn synchronizes the first processor 304 according to the suspend command. The suspend command indicates a corresponding one of a group of processing elements comprising the second processor 306, one or more tasks 402, and one or more associated queues 404 is no longer available to process service applications.

For the case where the suspend command corresponds to the second processor 306, all tasks 402 and associated queues 404 would no longer be available to process service applications from the first processor 304. Where the suspend command corresponds to one or more tasks 402, all associated queues 404 of the one or more tasks 404 would no longer be available for processing service applications from the first processor 304. This embodiment, however, leaves room for other tasks 402 and associated queues 404 of the second processor 306 to potentially process service applications from the first processor 304.

Where a suspend command represents one or more queues 404 of a particular task 402, the queues 404 identified are no longer available to process service applications from the first processor 304. This embodiment, however, leaves room for other queues 404 within the selected task 402 to receive service applications from the first processor 304.

Reestablishing reception of service applications at the corresponding one of the group of processing elements mentioned above occurs upon satisfying the flow control criteria as described above. When this happens, the second processor 306 submits a resume command to the inter-processor manager 308 indicating the corresponding one of the group of processing elements is available to process service applications, which in turn synchronizes the first processor 304 according to the resume command. In an alternative embodiment where the inter-processor manager 308 is not used, the suspend and resume commands are transmitted from the second processor 306 to the first processor 304.

The variable capacity level utilizing a hysteresis behavior as described above provides a stable environment for managing queues 404 using suspend and resume commands. The system designer of the processing system 206 can select the MID 504 threshold and hysteresis range defined by boundaries 504-505 for each queue 404 in a manner that optimizes the overall performance of the system. Alternatively, this threshold and variable range can be dynamically altered by each of the queues 404 according to historical usage and performance of service applications processed in each queue 404. This processing can also take place in the inter-processor manager 308 monitoring the plurality of processors.

Referring back to step 602, the first processor 304 can be programmed to request an update regarding the capacity of the queue 404 of the second processor 306 before delegating the service application thereto. Alternatively, the first processor 304 can be programmed to request an update from a plurality of processors exceeding two, thereby selecting an optimal processor (e.g., the second processor 306) according to the status of the queue(s) 404 operating in said processor.

In yet another embodiment, the inter-processor manager 308 can request an update from the queue 404 of each processor, and submit an aggregate update to the processors representing the capacity of each of the queues of the plurality of processors. The aggregate update can then be used by the first processor 304 to select an optimal resource for processing the service application.

In an alternative embodiment, one or more of the processors (e.g., a third processor, not shown in FIG. 3) can autonomously submit an update regarding the capacity of its queue(s) 404 to the plurality of processors in the processing system 206. Where an inter-processor manager 308 is used, the update can be submitted to the plurality of processors for later dissemination.

It should be evident from the foregoing embodiments that each improves the effectiveness of the first processor 304 in selecting an available resource for processing the service application. In addition, it would be appreciated by one of ordinary skill in the art that the frequency or periodicity of these updates can be adjusted statically, dynamically or a combination thereof according to the needs of the processing system 206.

Referring back to step 610, the second processor 306 can be programmed to negotiate with the first processor 304 processing of the service application. Negotiations can entail, for instance, postponing acceptance or rejection of the service application and re-delegating the service application to another one of the plurality of processors in the processing system 206. In either case, the negotiations serves as a means to obtain additional time for processing and reducing the size of the queue(s) 404 of the second processor 306.

In light of the foregoing description, it should be recognized that embodiments in the present invention could be realized in hardware, software, or a combination of hardware and software. These embodiments could also be realized in numerous configurations contemplated to be within the scope and spirit of the claims below. It should also be understood that the claims are intended to cover the structures described herein as performing the recited function and not only structural equivalents. The claims are sufficiently general to include equivalent structures.

For example, a software implementation of a method and a hardware implementation of the same method can not be structural equivalents in that the software implementation is dependent on a processing system for execution, while the hardware implementation may have self-contained processing means. It is well known the art, however, that software and hardware implementations may be designed to be equivalent structures generating the same results. Accordingly, all equivalent modifications and additions to the description above are intended to be inclusive of the scope the following claims.

What is claimed is:

1. In a multiprocessor system comprising a plurality of processors in a mobile wireless device, each processor capable of processing at least one queue of at least one service application, and at least one task comprising at least one of the at least one queue, a method comprising the steps of:
    delegating a service application from a first hardware processor of the plurality of processors to a queue of the at least one queue of a second hardware processor of the plurality of processors;
    evaluating the queue of the second hardware processor according to a flow control criteria that utilizes a hysteresis effect and comprises a variable capacity threshold for each queue;
    processing the service application at the second hardware processor upon satisfying the flow control criteria; and
    rejecting the service application at the second hardware processor upon failing to satisfy the flow control criteria;
    wherein the service application is selected among mobile wireless device applications in the mobile wireless device comprising voice processing, multimedia processing, data message processing, and other housekeeping functions of the mobile wireless device; and
    wherein the flow control criteria comprising the variable capacity threshold for each queue eliminates oscillations around the variable capacity threshold that occur when increasing and decreasing the queue of the at least one queue.

2. The method of claim 1, further comprising the steps of:
    processing the service application at the second processor if the variable capacity threshold of the queue is not exceeded; and rejecting the service application at the second processor upon exceeding the variable capacity threshold of the queue, wherein the variable capacity threshold is varied according to historical usage and performance of service applications.

3. The method of claim 2, wherein the variable capacity threshold is variable to manage the queues of the processors by way of suspend and resume commands in a stable manner.

4. The method of claim 1, comprising the steps of:

submitting a suspend command from the second processor to the plurality of processors indicating a corresponding one of a group of processing elements comprising the second processor, the queue, and a task of the at least one task of the second processor corresponding to the queue is no longer available to process service applications; and upon reestablishing the flow control criteria, submitting a resume command from the second processor to the plurality of processors indicating the corresponding one of the group of processing elements is available to process service applications, wherein the submitting of the suspend command and the submitting of the resume command manage the at least one queue and corresponding at least one task by increasing and decreasing the at least one queue of the at least one service application.

5. The method of claim 1, further comprising the step of requesting at the first processor an update from the queue of the second processor prior to delegating the service application thereto.

6. The method of claim 1, further comprising the step of requesting at the first processor an update from the at least one queue of the plurality of processors prior to selecting the second processor to process the service application.

7. The method of claim 1, wherein the multiprocessor system further comprises an inter-processor manager, and wherein the method further comprises the steps of:

requesting at the inter-processor manager an update from the at least one queue of each processor; and submitting from the inter-processor manager an aggregate update to the plurality of processors, the aggregate update representing the update received from each processor.

8. The method of claim 1, wherein the multiprocessor system further comprises an inter-processor manager, and wherein the method further comprises the steps of:

submitting a suspend command from the second processor to inter-processor manager indicating a corresponding one of the group comprising the second processor, the queue, and a task of the at least one task of the second processor corresponding to the queue is no longer available to process service applications;

synchronizing at the inter-processor manager the second processor according to the suspend command;

upon reestablishing the flow control criteria, submitting a resume command from the second processor to inter-processor manager indicating the corresponding one of the group is available to process service applications; and synchronizing at the inter-processor manager the second processor according to the resume command, wherein the submitting of the suspend command and the submitting of the resume command manage the at least one queue and corresponding at least one task by increasing and decreasing the at least one queue of the second processor.

9. The method of claim 1, further comprising the step of submitting from a third processor of the plurality of processors an update to the plurality of processors of the at least one queue of the third processor.

10. The method of claim 1, further comprising the steps of:

processing the service application at the second processor if the capacity threshold of the queue is not exceeded; and negotiating between the second processor and the first processor processing of the service application upon exceeding the capacity threshold of the queue.

11. The method of claim 10, wherein the negotiating step further comprises the step of submitting to the first processor among one of a group of negotiation options comprising postponing rejection or acceptance of the service application, and re-delegating the service application to another one of the plurality of processors.

12. A multiprocessor system, comprising:

a plurality of processors in a mobile wireless device, each processor capable of processing at least one queue of at least one service application of the mobile wireless device, and at least one task comprising at least one of the at least one queue; and wherein a first processor and a second processor of the plurality of processors is each programmed to:

delegate a service application from the first processor to a queue of the at least one queue of the second processor;

evaluate the queue at the second processor according to flow control criteria utilizing a hysteresis effect that comprises a variable capacity threshold for each queue;

process the service application at the second processor upon satisfying the flow control criteria; and reject the service application at the second processor upon failing to satisfy the flow control criteria;

wherein the flow control criteria comprising the variable capacity threshold for each queue eliminates oscillations around the variable capacity threshold that occur when increasing and decreasing the queue of the at least one queue.

13. The multiprocessor system of claim 12, wherein the first and second processors are further programmed to:

process the service application at the second processor if the variable capacity threshold of the queue is not exceeded; and reject the service application at the second processor upon exceeding the variable capacity threshold of the queue.

14. The multiprocessor system of claim 13, wherein the variable capacity threshold eliminates oscillations that occur when increasing and decreasing the queue of the at least one queue of the second processor by way of suspend and resume commands.

15. The multiprocessor system of claim 13, wherein the first processor and the second processor are programmed to:

submit a suspend command from the second processor to the plurality of processors indicating a corresponding one of a group of processing elements comprising the second processor, the queue, and a task of the at least one task of the second processor corresponding to the queue is no longer available to process service applications; and upon reestablishing the flow control criteria, submit a resume command from the second processor to the plurality of processors indicating the corresponding one of the group of processing elements is available to process service applications, wherein the submitting of the suspend command and the submitting of the resume command manage the at least one queue and corresponding at least one task by increasing and decreasing the at least one queue of the second processor.

16. A mobile wireless device, comprising:

a multiprocessor system having a plurality of hardware processors, each processor capable of processing at least one queue of at least one service application, and at least one task comprising at least one of the at least one queue; and wherein a first processor and a second processor of the plurality of processors are programmed to:

receive and transmit messages by way of a wireless transceiver to a wireless communication system;

delegate a service application from the first processor to a queue of the at least one queue of the second processor;

evaluate the queue at the second processor according to a flow control criteria utilizing a hysteresis effect that comprises a variable capacity threshold for each queue;

process the service application at the second processor upon satisfying the flow control criteria; and reject the service application at the second processor upon failing to satisfy the flow control criteria;

wherein the flow control criteria comprising the variable capacity threshold for each queue eliminates oscillations around the variable capacity threshold that occur when increasing and decreasing the queue of the at least one queue.

17. The mobile wireless device of claim 16, wherein the flow control criteria comprises a capacity threshold for each queue, and wherein the first and second processors are further programmed to dynamically alter the at least one queue according to historical usage and performance of service applications by:

processing the service application at the second processor if the variable capacity threshold of the queue is not exceeded; and rejecting the service application at the second processor upon exceeding the variable capacity threshold of the queue;

wherein the service application is selected among voice processing, multimedia processing, data message processing, and other house-keeping functions of the mobile selective call device.

18. The mobile wireless device of claim 16, wherein the second processor is further programmed to:

submit a suspend command from the second processor to the plurality of processors indicating a corresponding one of a group of processing elements comprising the second processor, the queue, and a task of the at least one task of the second processor corresponding to the queue is no longer available to process service applications; and upon reestablishing the flow control criteria, submitting a resume command from the second processor to the plurality of processors indicating the corresponding one of the group of processing elements is available to process service applications, wherein the submitting of the suspend command and the submitting of the resume command manage the at least one queue and corresponding at least one task by increasing and decreasing the at least one queue of the second processor.

19. The mobile wireless device of claim 16, wherein the first and second processors are further programmed to request an update from the queue of the second processor prior to delegating the service application thereto.

\* \* \* \* \*